(12) United States Patent
Tamura et al.

(10) Patent No.: US 8,090,064 B2
(45) Date of Patent: Jan. 3, 2012

(54) SINGLE LOOP FREQUENCY AND PHASE DETECTION

(75) Inventors: Hirotaka Tamura, Kanagawa (JP); Nikola Nedovic, San Jose, CA (US); William W. Walker, Los Gatos, CA (US)

(73) Assignee: Fujitsu Limited, Kawasaki (JP)

( * ) Notice: Subject to any disclaimer, the term of this patent is extended or adjusted under 35 U.S.C. 154(b) by 1009 days.

(21) Appl. No.: 12/022,725

(22) Filed: Jan. 30, 2008

(65) Prior Publication Data

US 2008/0192873 A1    Aug. 14, 2008

Related U.S. Application Data

(60) Provisional application No. 60/889,053, filed on Feb. 9, 2007.

(51) Int. Cl.
*H04L 7/00* (2006.01)
(52) U.S. Cl. ...................................................... 375/354
(58) Field of Classification Search .................. 375/354, 375/355, 356, 357, 358, 359, 360, 362, 363, 375/364, 370, 371, 373, 376; 327/105, 141, 327/153, 156, 159, 163, 199, 261
See application file for complete search history.

(56) References Cited

U.S. PATENT DOCUMENTS

| | | | |
|---|---|---|---|
| 652,230 A | 6/1900 | Pupin | |
| 5,566,204 A * | 10/1996 | Kardontchik et al. | 375/219 |
| 6,320,921 B1 * | 11/2001 | Gu | 375/376 |
| 7,555,085 B1 * | 6/2009 | Risk et al. | 375/354 |
| 2003/0002606 A1 * | 1/2003 | Chen et al. | 375/354 |
| 2003/0086339 A1 * | 5/2003 | Dally et al. | 368/202 |
| 2004/0165679 A1 * | 8/2004 | Kwak | 375/316 |
| 2005/0017772 A1 * | 1/2005 | Hsiao et al. | 327/156 |
| 2006/0198482 A1 * | 9/2006 | Meltzer et al. | 375/376 |
| 2007/0081618 A1 * | 4/2007 | Jeon | 375/360 |

OTHER PUBLICATIONS

O. Heaviside. "Electromagnetic induction and its propagation," *The Electrician XIX*, pp. 79-81, 1887.
M. Mokhtari et al., "InP-HBT chip-set for 40 Gb/s fiber optical communication systems operational at 3 V," *IEEE J. Solid-State Circuits*, vol. 32, No. 9, pp. 1371-1383, Sep. 1997.
H.O. Johansson and C. Svensson, "Time resolution of nMOS sampling switches used on low-swing signals," *IEEE J. Solid-State Circuits*, vol. 33, No. 2, pp. 237-245, Feb. 1998.
C.K. Yang, R. Farjad-Rad, and M.A. Horowitz, "A 0.5 μm CMOS 4.0-Gbit/s serial link transceiver with data recovery using oversampling," *IEEE J. Solid-State Circuits*, vol. 33, No. 5, pp. 713-722, May 1998.

(Continued)

*Primary Examiner* — David C. Payne
*Assistant Examiner* — Syed Haider
(74) *Attorney, Agent, or Firm* — Baker Botts L.L.P.

(57) ABSTRACT

In one embodiment, a method includes receiving a data signal comprising a plurality of bits. The method further includes generating a clock signal. A plurality of samples is acquired from the data signal at a sampling rate determined by the clock signal and it is determined whether a transition point from a first bit in the plurality of bits to a second bit in the plurality of bits occurs within the plurality of samples. If it is determined that the transition point occurs within the plurality of samples, a state machine comprising a plurality of states transitions from a first state to a second state. If the second state indicates a non-zero amount of phase displacement between the clock signal and the data signal, the clock signal is adjusted to correlate with the data signal.

20 Claims, 4 Drawing Sheets

OTHER PUBLICATIONS

M. Wurzer et al., "A 40 Gb/s integrated clock and data recovery circuit in a 50 GHz $f_T$ silicon bipolar technology," *IEEE J. Solid-State Circuits*, vol. 34, No. 9, pp. 1320-1324, Sep. 1999.

J. Wood, T.C. Edwards, and S. Lipa, "Rotary traveling-wave-oscillator arrays: A new clock technology," *IEEE J. Solid-State Circuits*, vol. 36, No. 11, pp. 1654-1665, Nov. 2001.

M. Reinhold et al., "A fully integrated 40 Gb/s clock and data recovery IC with 1:4 demux in SiGe technology", *IEEE J. Solid-State Circuits*, vol. 36, No. 12, pp. 1937-1945, Dec. 2001.

SerDes framer interface level 5 (SFI-5): Implementation agreement for 40 Gb/s interface for physical layer devices, *Optical Internetworking Forum*, Jan. 29, 2002.

G. Georgiou et al., "Clock and data recovery IC for 40 Gb/s fiber-optic receiver," *IEEE J. Solid-State Circuits*, vol. 37, No. 9, pp. 1120-1125, Sep. 2002.

A. Ong et al., "A 40-43 Gb/s clock and data recovery IC with integrated SFI-5 1:16 demultiplexor in SiGe technology," in *IEEE ISSCC Dig. Tech. Papers*, pp. 234-235, Feb. 2003.

J. Yen et al., "A fully integrated 43.2 Gb/s clock and data recovery and 1:4 demux IC in InP HBT technology," in *IEEE ISSCC Dig. Tech. Papers*, pp. 240-241, Feb. 2003.

M. Megheli et al., "A 0.18 μm SiGe BiCMOS receiver and transmitter chipset for SONET OC-768 transmission systems," in *IEEE ISSCC Dig. Tech. Papers*, pp. 230-231, Feb. 2003.

A. Koyama et al., "43 Gb/s full-rate clock 16:1 multiplexor and 1:16 demultiplexor with SFI-5 interface in SiGe BiCMOS technology," in *IEEE ISSCC Dig. Tech. Papers*, pp. 232-223, Feb. 2003.

J. Lee and B. Razavi, "A 40 Gb/s clock and data recovery circuit in 0.18 μm CMOS technology," in *IEEE ISSCC Dig. Tech. Papers*, pp. 242-243, Feb. 2003.

Y. Okaniwa et al., "A 0.11 μm CMOS clocked comparator for high-speed serial communications," in *Symp. VLSI Circuits Dig.*, pp. 198-201, Jun. 2004.

N. Nosaka et al., "A 39-to-45 Gbit/s multi-data rate clock and data recovery circuit with a robust lock detector," *IEEE J. Solid-State Circuits*, vol. 39, No. 8, pp. 1361-1365, Aug. 2004.

H. Chen, R. Shi, C.K. Cheng, and D. Harris, "Surfliner: A distortionless electrical signaling scheme for speed of light on-chip communications," in *Int. Conf. Computer Design*, pp. 497-502, Oct. 2005.

F.M. Gardner, "Phaselock Techniques", Third Edition, p. 248, J. Wiley & Sons, Hoboken, NJ, 2005.

*Sierra Monolithics SMI4034 Sonet OC/768 1:16 CDR/ Demultiplexor Data Sheet*, 2006.

*Finisar BBTR4005 40 Gb/s Short Reach Transponder Product Brief*, Jan. 23, 2006.

M. van Ierssel et al., "A 3.2 Gb/s semi-blind-oversampling CDR," in *IEEE ISSCC Dig. Tech. Papers*, pp. 334-335, Feb. 2006.

N. Tzartzanis and W. Walker, "A reversible poly-phase distributed VCO," in *IEEE ISSCC Dig. Tech. Papers*, pp. 596-597, Feb. 2006.

*Core Optics 40 Gb/s Single Channel/Short Reach Transponder CO40TSSII Data Sheet*, Mar. 2006.

D. Kucharski and K. Kornegay, "2.5 V 43-45 Gb/s CDR circuit and 55 Gb/s PRBS generator in SiGe using a low-voltage logic family," *IEEE J. Solid-State Circuits*. vol. 41, No. 9, pp. 2154-2165, Sep. 2006.

SerDes framer interface level 5 phase 2 (SFI-5.2): Implementation agreement for 40 Gb/s interface for physical layer devices, *Optical Internetworking Forum*, Oct. 2, 2006.

T. Toifl et al., "A 72 mW 0.03 mm$_2$ inductorless 40 Gb/s CDR in 65 nm SOI CMOS," in *IEEE ISSCC Dig. Tech. Papers*, pp. 226-227, Feb. 2007.

N. Nedovic, N. Tzartzanis, H. Tamura, F. Rotella, M. Wiklund, Y. Mizutani, Y. Okaniwa, T. Kuroda, J. Ogawa, and W.W. Walker, "A 40-to-44 Gb/s 3 x oversampling CMOS CDR/1:16 DEMUX", in *IEEE ISSCC Dig. Tech. Papers*, pp. 224-225, Feb. 2007.

\* cited by examiner

SINGLE LOOP FREQUENCY AND PHASE DETECTION

CROSS REFERENCE TO RELATED APPLICATIONS

This application claims the benefit under 35 U.S.C. §119 (e) of U.S. Provisional Application No. 60/889,053, entitled "Frequency Application Scheme Using Oversampling," filed Feb. 9, 2007.

TECHNICAL FIELD

The present disclosure relates generally to frequency acquisition, and more particularly to single loop frequency and phase detection.

BACKGROUND

A Phase Locked Loop ("PLL") circuit is an electronic control system that may be used, in part or in whole, to generate or maintain one signal that is locked onto the phase and frequency of another signal. While particular embodiments of a PLL may vary with respect to their component parts and devices, an example PLL may include devices and components such as a frequency/phase detector, a charge pump, a loop filter, and a variable-frequency signal generator (e.g., a voltage controlled oscillator ("VCO")). In an example situation, a PLL may receive a input data signal from an outside source (e.g., an input signal from a remote data source) and may compare the phase of the input data signal with a locally-generated variable-frequency clock signal. The locally-generated variable-frequency clock signal may originate, for example, from a variable-frequency signal generator over which the PLL has control. As part of the comparison, a phase detector within the PLL may determine a phase difference between the input data signal and the variable-frequency clock signal and may use the phase difference to generate a phase correction signal that will ultimately increase or decrease the phase of the VCO.

For example, after the phase detector has detected a phase difference between the input data signal and the clock signal and has generated a corresponding phase correction signal, the phase correction signal may be input into a charge pump which generates a current in response to the phase correction signal. In turn, the current generated by the charge pump may be filtered by a loop filter and may dictate the output voltage of the loop filter (e.g., a large current from the charge pump translates to a large output voltage of the loop filter). In particular embodiments, the output voltage of the loop filter controls the frequency of the clock signal generated by the VCO. Thus, by controlling the phase of the VCO using phase correction signals, the PLL may adjust the phase of the VCO to match the phase of the input data signal.

One of ordinary skill in the art will appreciate that the above-described example was presented for the sake of explanatory simplicity and that PLLs which use feedback to maintain the frequency/phase of a VCO-produced signal in specific relationship with an input data signal may be used in frequency synthesizers and in a host of other applications.

DESCRIPTION OF EXAMPLE EMBODIMENTS

Overview

In one embodiment, a signal processing method includes receiving a data signal comprising a plurality of bits, and the data signal having a frequency and a phase. The method further includes generating a clock signal having a frequency and a phase. A plurality of samples is acquired from the data signal at a sampling rate determined by the clock signal and it is determined whether a transition point from a first bit in the plurality of bits to a second bit in the plurality of bits occurs within the plurality of samples. If it is determined that the transition point occurs within the plurality of samples, a state machine comprising a plurality of states transitions from a first state to a second state. If the second state indicates a non-zero amount of phase displacement between the clock signal and the data signal, the clock signal is adjusted to correlate with the data signal, and if the second state indicates no amount of phase displacement between the clock signal and the data signal, a current phase and a current frequency of the clock signal are maintained.

In particular embodiments, the data signal may be a serial data signal and the operation of the phase and frequency acquisition system may rely on sampling the data signal M times (where M>2) per data unit interval (UI). The phase error between the clock signal and the data signal may be detected by tracking the position of the transition points between bits of data in the data signal. In particular embodiments each state in the state machine may correspond to a discrete amount of phase displacement between the data signal and the clock signal. Thus, any time the state machine is in a state that corresponds to a non-zero amount of phase displacement between the data signal and the clock signal, the phase of the clock signal may be adjusted to correlate with the data signal by means of the feedback that speeds up or slows down the clock signal.

Description

Figure 1:
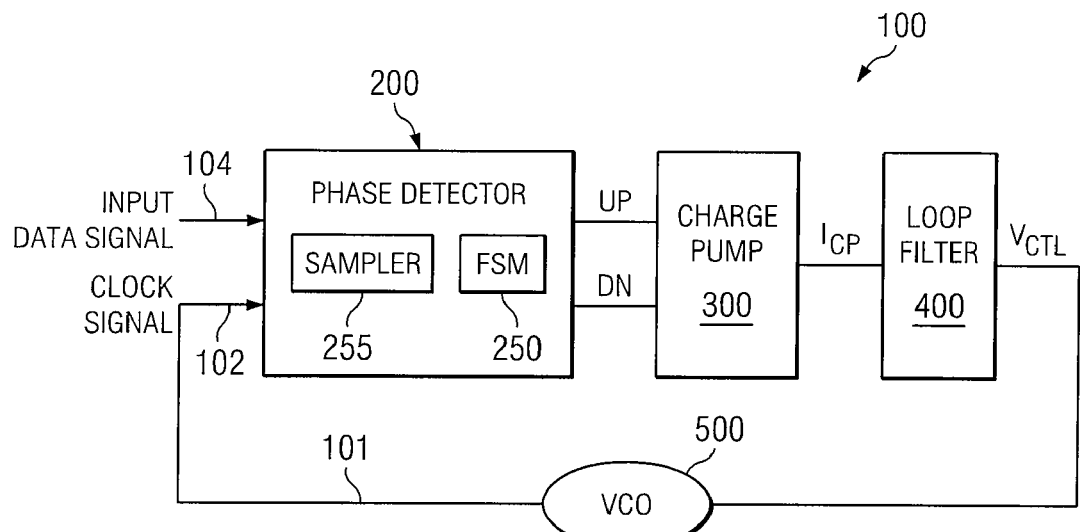
FIG. 1 illustrates an example phase and frequency acquisition system according to an example embodiment of the present disclosure.

FIG. 1 illustrates an example system 100 for phase or frequency acquisition and maintenance that includes a phase detector 200 for detecting a phase or frequency difference between two signals, a charge pump 300 for receiving a phase or frequency correction signal from phase detector 200 and outputting a corresponding current ($I_{CP}$), a loop filter 400 controlling the dynamic behavior of a feedback loop 101 and for filtering out any high frequency noise associated with the current output from charge pump 300, a voltage controlled oscillator (VCO 500) for producing a variable-frequency clock signal 102 in response to the voltage output of loop filter 400 ($V_{CTL}$), and a feedback loop 101 that couples these components together. In particular embodiments, system 100 may receive a input data signal 104 and produce a clock signal 102 that matches the frequency and phase of input data signal 104 without the need for an external reference clock as described in further detail below.

In accordance with an example embodiment of the present disclosure, phase detector 200 may receive input data signal 104 and may compare the phase of input data signal 104 to the phase of clock signal 102. If phase detector 200 detects a phase difference between input data signal 104 and clock signal 102, phase detector 200 may generate a phase correction signal to adjust the phase of clock signal 102. The phase correction signal may comprise an up signal ("UP") or a down signal ("DN") wherein an UP signal increases the phase and the frequency of clock signal 102 and a DN signal decreases the phase and the frequency of clock signal 102.

In particular embodiments, phase detector 200 may comprise a finite state machine 250 and a sampler 255 and may maintain the phase between input data signal 104 and clock signal 102 by using finite state machine 250 to analyze and track samples of input data signal 104 obtained by sampler 255. Finite state machine 250 may be any component or device of hardware or software or combination of two or more such components or devices operable to track one or more phase states, each phase state being respectively related to an amount of phase displacement between a clock signal 102 and input data signal 104. As an example and not by way of limitation finite state machine 250 may include a First In First Out (FIFO) buffer. One of ordinary skill in the art will appreciate that the above-described embodiments of state machine 250 were presented for the sake of explanatory simplicity and will further appreciate that the present disclosure contemplates the use of any suitable component or combination of components operable to track one or more phase states, each phase state being respectively related to an amount of phase displacement between two signals.

Sampler 255 may be any component of hardware capable obtaining samples of input data signal 104. As an example an not by way of limitation, sampler 255 may be a master-slave latch or a sense amplifier-based latch. In particular embodiments, the sampling rate of sampler 255 may be determined by clock signal 102. More particularly, the position and frequency of the samples taken by sampler 255 relative to input data signal 104 may be determined by the phase and frequency of clock signal 102 relative to input data signal 104. As an example and not by way of limitation, if the frequency of clock signal 102 is greater than the frequency of input data signal 104, sampler 255 may obtain more than nominal number of samples per each bit. As an additional example and not by way of limitation, if the frequency of clock signal 102 is less than the frequency of input data signal 104, sampler 255 may obtain fewer than nominal number of samples per each bit. Likewise, a misalignment of the phase of clock signal 102 and the phase of input data signal 104 may cause a misalignment of the samples taken by sampler 255 relative to the bits in input data signal 104 (e.g., sampler 255 may take samples from the wrong position on a particular bit or in more extreme cases of phase misalignment may sample the wrong bit altogether). One of ordinary skill in the art will appreciate that the above-described embodiments of sample 255 were presented for the sake of explanatory simplicity and will further appreciate that the present disclosure contemplates the use of any suitable component or combination of components to sample input data signal 104.

In particular embodiments, system 100 may be configured to sample input data signal 104 at a predetermined rate (e.g., 3× oversampling). Accordingly, sampler 255 may obtain samples of input data signal 104 which are supplied to state machine 250 for analysis. As explained more fully below, state machine 250 may analyze the samples from sampler 250 to determine whether there is a phase difference between input data signal 104 and clock signal 102, and may record any such phase difference as a change in state. Based on a state change, state machine 250 may assert phase correction signals (e.g., an UP signal or a DN signal) to alter the phase of VCO 500 until the phase of clock signal 102 matches the phase of input data signal 104, in which case, state machine 250 will transition to a predetermined state that indicates a phase match between the signals. By continuously recording phase discrepancies between clock signal 102 and input data signal 104 as state transitions, and by iteratively asserting phase correction signals to adjust the phase of clock signal 102 until state machine 250 transitions to a predetermined state that indicates a phase match between the signals, system 100 may acquire and/or maintain the phase of clock signal 102 and input data signal 104 even over a wide range of phase drifts.

In particular embodiments, system 100 may use finite state machine 250 in conjunction with sampler 255 to acquire the frequency of input data signal 104 without the use of an external reference clock (e.g., without the need for a predetermined clock signal to synchronize system 100 with input data signal 104). For example, when a frequency difference exists between clock signal 102 and input data signal 104, the samples from sampler 255 may cause state machine 250 to unidirecitionally change states until state machine 250 underflows or overflows. For example, an underflow or overflow of state machine 250 may occur if the progression of state changes being tracked exceeds the number of states in state machine 250. When an underflow or overflow occurs, state machine 250 may interpret such activity as a frequency discrepancy between clock signal 102 and input data signal 104 and may assert one or more frequency correction signals to alter the frequency of VCO 500 until the frequency of clock signal 102 matches the frequency of input data signal 104. When the frequency of input data signal 104 matches the frequency of clock signal 102, state machine 250 will stop overflowing or underflowing and will cease asserting frequency correction signals. Additionally, after system 100 has acquired the frequency of input data signal 104 (e.g., stopped underflowing or overflowing), state machine 250 may continue to operate in phase detection mode as described above in order to acquire or maintain the phase of the two signals.

A frequency correction signal may comprise a frequency up signal ("FRUP") or a frequency down signal ("FRDN"). A FRUP signal may increase frequency of VCO 500 and a FRDN signal may decrease the frequency of VCO 500. In particular embodiments, the FRUP signal and the FRDN signal are similar to the UP and DN signals described above, with the exception causing a larger current output from charge pump 300 (which, in turn, causes a faster phase and frequency adjustment of VCO 500). In particular embodiments, repeated assertion of the FRUP/FRDN signals over a period of time results in an increase/decrease of the frequency of VCO 500.

As an example an not by way of limitation, an UP signal may result in charge pump 300 generating a current of +5 milliamps while an FRUP signal may result in charge pump 300 generating a current of +10 milliamps. Likewise, an DN signal may result in charge pump 300 generating a current of −5 milliamps while an FRDN signal may result in charge pump 300 generating a current of −10 milliamps.

One of ordinary skill in the art will appreciate that the above-described implementation of system 100 as described with respect to a clock signal and a input data signal was presented for the sake of explanatory simplicity and will further appreciate that the present disclosure contemplates the use of system 100 to synchronize any suitable signal or signals. One of ordinary skill in the art will further appreciate that the above-described components and topology of system 100 were presented for the sake of explanatory simplicity and that the present disclosure contemplates any suitable topology of any suitable components to maintain the frequency and phase of one signal in specific relationship with that of another signal.

Figure 2:
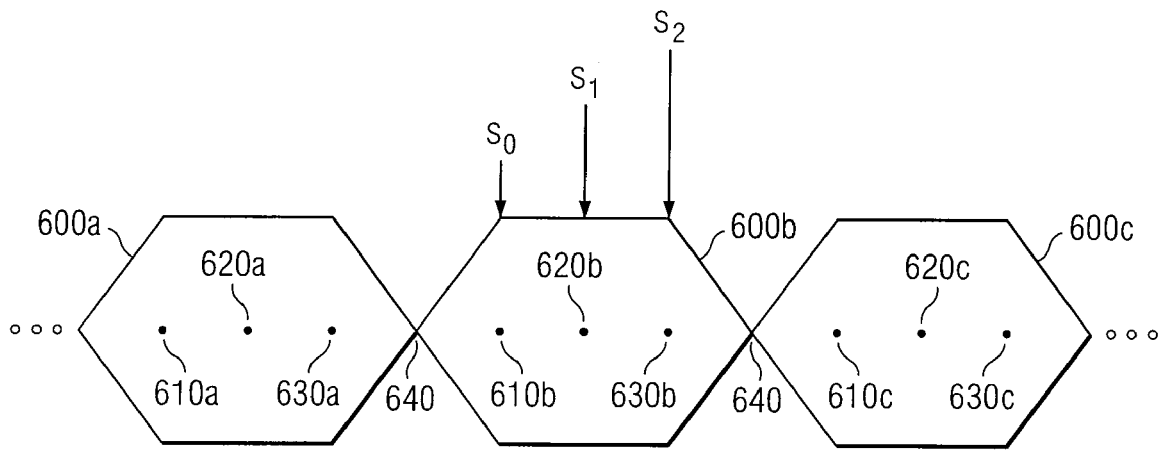
FIG. 2 illustrates three example bits of data to be sampled by the system of FIG. 1 according to an example embodiment of the present disclosure.

FIG. 2 illustrates three example bits of data (600*a*, 600*b*, and 600*c*) to be sampled by system 100 using a 3× oversampling scheme according to an example embodiment of the present disclosure. For explanatory purposes, bit 600*b* represents the bit to be sampled at a particular instant ("the target bit") when system 100 is properly calibrated (e.g., when the phase and frequency of clock signal 102 and input data signal 104 match).

In 3× oversampling schemes, each bit 600 may have a first sampling position 610, a second sampling position 620, and a third sampling position 630 respectively associated with predetermined sample locations. As an example and not by way of limitation, position 610 may denote a sampling position immediately following a transition point 640 from the previous bit. Position 620 may denote a sampling position located at the temporal center of each bit (e.g., the center of the "eye" of the data), and position 630 may denote a sampling position immediately preceding a transition point 640 to the next bit. This description assumes that bits 600 enter sampler 255 from left to right (e.g., bit 600*a* enters first, bit 600*b* enters second, and bit 600*c* enters last).

The temporal length of each bit 600 (e.g., pictorially represented as the distance from one transition point 640 to the next transition point 640) may be referred to as a Unit Interval ("UI"). When properly calibrated for 3× oversampling, system 100 obtains 3 samples per UI (e.g., 3 samples per bit 600). Accordingly, the temporal space between each sample position for 3× oversampling is ⅓ of a UI. As an example and not by way of limitation, the UI for 1 bit of data in a 40 Gigabits per second (Gbps) data signal would be 25 picoseconds (ps). Moreover, if such a signal were sampled at 3× oversampling, the temporal space between each sample (e.g., sample S0 and sample S1) would be approximately 8.3 ps.

When used in a 3× oversampling scheme, sampling circuit 255 may respectively obtain three samples (e.g., a first sample S0, a second sample S1, and a third sample S2) of each bit 600 as each bit 600 passes through sampler 255. When the phase and frequency of clock signal 102 matches the phase and frequency of input data signal 104, each sample continually aligns with the same predetermined location on each bit 600 (e.g., samples S0, S1, S2 respectively align with positions 610*b*, 620*b*, and 630*b* assuming bit 600*b* is the target bit).

However, the phase of VCO 500 may drift from the phase of input data signal 104 or may otherwise fail to match the phase of input data signal 104. When the phase of VCO 500 does not match the phase of the input signal, the temporal positions of the samples obtained by sampler 255 (e.g., sample S0, sample S1, and sample S2) may not align with their predetermined positions (e.g., position 610, position 620, and position 630). For example, assuming that bit 600*b* is the target bit and the phase of VCO 500 drifts such that the phase of clock signal 102 lags behind the phase of input data signal 104 by ⅓ of a UI, sample S1 will align with position 630*b* rather than with the center of the eye of the data (e.g., position 620*b*) and will continue to be so misaligned until the phase of clock signal 102 is increased by ⅓ of a UI.

In particular embodiments a phase misalignment between clock signal 102 and input data signal 104 may be recorded as a change in state of finite state machine 250, wherein each state in state machine 250 may indicate a particular degree of phase misalignment. As an example and not by way of limitation, state "0" may indicate that the phase of clock signal 102 matches the phase of input data signal 104, state "+1" may indicate that the phase of clock signal 102 lags behind the phase of input data signal 104 by ⅓ of a UI, and state "−1" may indicate that the phase of clock signal 102 leads the phase of input data signal 104 by ⅓ of a UI, etc. One of ordinary skill in the art will appreciate that the relationship between the states of state machine 250 and the phase displacements between clock signal 102 and input data signal 104 was presented for the sake of explanatory simplicity and will further appreciate that the present disclosure contemplates the use of any such relationship to suitable to indicate the degree of phase misalignment between clock signal 102 and input data signal 104.

Figure 3:
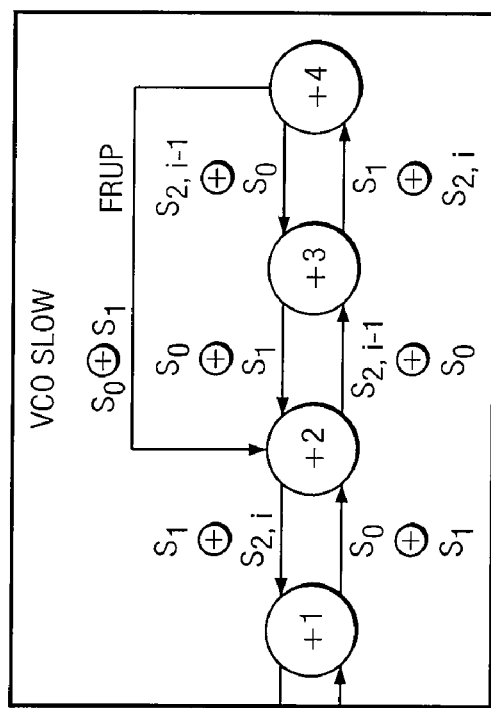
FIG. 3 illustrates an example state scheme by which the system of FIG. 1 may obtain and maintain the phase of a input data signal according to an example embodiment of the present disclosure.
Figure 3:
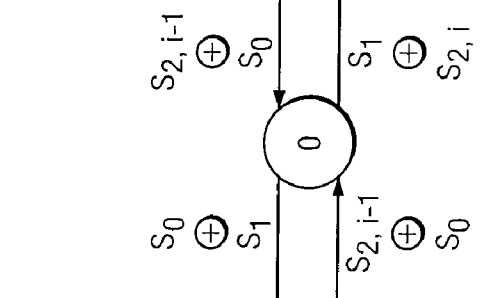

FIG. 3 illustrates an example state scheme that may be implemented by state machine 250 for frequency and phase acquisition in accordance with the present disclosure. In particular embodiments, state machine 250 may be accompanied by a FIFO having nine entries available (e.g., one entry for each of the states −4, −3, −2, −1, 0, +1, +2, +3, +4). In particular embodiments, the states −4, −3, −2, −1, 0, +1, +2, +3, and +4 may respectively correspond to phase errors between the data signal 104 and clock 102 of −4/3 UI, −3/3 UI, −⅔ UI, ⅓ UI, 0, ⅓ UI, ⅔ UI, 3/3 UI, and 4/3 UI, where negative states designate that clock signal 102 is faster than data signal 104 and positive states designate that clock signal 102 is slower than data signal 104. As mentioned above with reference to FIG. 2, each state in state machine 250 may be associated with the location of a particular sample (e.g. sample S1) relative to the center of the eye of the data (e.g., position 620*b*). As an example and not by way of limitation, when the phase and frequency of clock signal 104 matches the phase and frequency of input data signal 104, sample S1 should be properly aligned with the center of the eye of the data (as represented in FIG. 2). When sample S1 is proper aligned with position 620, samples S0, S1, and S2 should ideally have identical values (e.g., either all "1's" or all "0's") since all three samples are taken from the same bit 600 with no transition points 640 occurring between sample S0 and S1 or between S1 and S2.

In order to track the position of sample S1 with respect to the center of the eye of the data, finite state machine 250 may exclusively OR ("XOR") one or more of the surrounding samples to ascertain whether any transition points 640 have occurred at unexpected temporal locations. By performing an XOR function on the samples surrounding sample S1, finite state machine 250 may use the point of transition from one bit to the next (e.g., transition point 640) to determine and record the location of sample S1 relative to the center of the eye of the data.

As an example and not by way of limitation, when finite state machine 250 is in state "0," finite state machine 250 may XOR sample S0 and sample S1 to determine whether the value of sample S0 matches the value of sample S1. If the value of sample S0 matches the value of sample S1, then finite state machine 250 may determine that no data transition has taken place between sample S0 and sample S1 and may remain in state "0." If the value of sample S0 does not match the value of sample S1, then finite state machine 250 may determine that a data transition has taken place between sample S0 and sample S1 and may accordingly change state from state "0" to state "−1." State "−1" may indicate that the phase of VCO 500 is leading the phase of the input signal by ⅓ UI, and that sample S1 is currently located 1 position ahead of the center of the eye of the data (e.g., aligned with position 610*b* rather than position 620*b*).

During the next sampling cycle, finite state machine 250 may repeat the above-described process taking into account the new position of sample S1 with respect to the center of the eye of the data. As an example and not by way of limitation, when finite state machine 250 is in state "−1," finite state machine 250 may XOR sample S1 and sample S2,$i$ to determine whether a data transition has occurred between sample S1 and sample S2,$i$. Sample S2,$i$ may be used to refer to sample S2 of the same bit (e.g., bit 600*b*) while sample S2,$i$−1 may be used to refer to sample S2 of the previous bit (e.g., bit 600*a*). If such a data transition has occurred (e.g., if the value of sample S1 does not match the value of sample S2,$i$) then finite state machine 250 may move from state "−1" to state "−2," thus indicating that the phase of VCO 500 is leading the phase of the input signal by ⅔ of a UI (e.g., indicating that sample S1 is aligned with position 630*a* rather than position 620*b*).

As another example and not by way of limitation, finite state machine 250, when in state "0," may XOR sample S1 and sample S2,$i$ to determine whether a data transition has occurred between sample S1 and sample S2,$i$. If a data transition has occurred (e.g., if the value of sample S1 does not match the value of sample S2,$i$) then finite state machine 250 may move from state "0" to state "+1" indicating that the phase of VCO 500 is lagging the phase of the input signal, and that sample S1 is currently located one position behind the center of the eye of the data (e.g., aligned with position 630*b* rather than position 620*b*).

When two bits of identical value are adjacent to one another (e.g., if bit 620*a* is a "1" and bit 620*b* is a "1"), state machine 250 may not be able to identify a data transition by performing an XOR function on the samples taken from bit 620*a* and 620*b* since both bits have identical values. However, such an occurrence will not affect the functionality of system 100 since state machine 250 and sampler 255 will continue in their normal operation pending the arrival of the next detectable data transition point 640. By continually applying the above-described state detection scheme, finite state machine 250 may use its states to keep track of the current position of sample S1 with respect to the center of the eye of the data.

When state machine 250 changes state in response to a phase difference between clock signal 102 and input data signal 104, state machine 250 may assert a phase correction signal to adjust the phase of VCO 500 to compensate for the difference. As an example and not by way of limitation, if the phase of clock signal 102 is leading the phase of input data signal 104 by ⅓ of a UI, state machine 250 may assert a DN signal to decrease the phase of VCO 500 by ⅓ of a UI, thus allowing state machine 250 to transition from state "−1" to state "0" once the phase adjustment has propagated through system 100. As another example and not by way of limitation, if the phase of clock signal 102 is lagging behind the phase of input data signal 104 by ⅓ of a UI, state machine 250 may assert an UP signal to increase the phase of VCO 500 by ⅓ of a UI, thus allowing state machine 250 to transition from state "+1" to state "0" once the phase adjustment has propagated through system 100.

In particular embodiments, the conditions under which state machine 250 may assert a phase correction signal (e.g., the method of asserting phase correction signals and the number of phase correction signals to be asserted) may be predetermined by a user. As an example and not by way of limitation, state machine 250 may assert a phase correction signal after remaining in a single state for more than "X" cycles in order to low-pass filter the phase error signal. As an additional example and not by way of limitation, state machine 250 may not assert a phase correction until it reaches a particular state (e.g., state "+2"), after which state machine 250 may begin asserting phase correction signals. As an additional example, a different combination of the phase correction signals may be asserted depending on the particular state of the state machine, so that the total current supplied by charge pump 300 becomes proportional to the state (and therefore the phase error) in order to achieve a more linear characteristic of phase detector 200. One of ordinary skill in the art will appreciate that the present disclosure contemplates using any suitable conditions to trigger a phase correction signal from state machine 250.

In particular embodiments, state machine 250 may only be permitted to transition between its states on a one-by-one basis. This is done to so that state machine 250 interprets a data transition between two particular samples as being caused by the smallest incremental amount of phase shift between clock signal 102 and data signal 104 that would cause such a data transition. For example, if state machine 250 is in state "+1", and the incoming samples are such that S0 XOR S1=1 (e.g., indicating there is a transition between sample S0 and sample S1), this data transition could reflect a number scenarios with respect to the phase of clock signal 102 relative to the phase of data signal 104. For instance, such a data transition could occur if: a) clock signal 102 went from being slower than data signal 104 by ⅓ UI to being slower than the data by ⅔ UI (e.g., corresponding to a change from state "+1" to state "+2"), b) clock signal 102 went from being slower than data signal 104 by ⅓ UI to being faster than data signal 104 by ⅓ UI (e.g., corresponding to a change from state "+1" to state "−1"), c) clock signal 102 went from being slower than data signal 104 by ⅓ UI to being faster than data signal 104 by 4/3 UI (e.g., corresponding to a change from state "+1" to state "−4"), etc. While all three scenarios described above would cause a data transition between sample S0 and S1 when state machine 250 is in state "+1," the state scheme employed by state machine 250 assumes that scenario (a) is the most likely scenario and therefore state machine 250 will interpret the transition point as a change in state from state "+1" to state "+2." Consequently, in particular embodiments state machine 250 is only permitted to transition between adjacent states when a transition point is detected so that state machine 250 interprets a transition point between two particular samples as being caused by the smallest incremental amount of phase shift between clock signal 102 and data signal 104 that would cause such a transition.

Since each state in state machine 250 may describe the position of sample S1 relative to the center of the eye of the data, a change of more than one state at a time may result in one or more samples being skipped or missed in order to realign sample S1 with the eye of the data. For example, a change from state "+2" directly to state "0" would correspond to a relocation of sample S1 from position 630*a* to position 620*b*. Consequently, when operating in within the range of state "−4" to state "+4," state machine 250 may be configured to only assert phase correction signals which will only transition sequentially between states.

However, if state machine 250 overflows (e.g., if a change in state occurs outside of state "+4") or underflows (e.g., if a change in state occurs outside of state "−4"), then state machine 250 may assert frequency correction signal (e.g., an FRUP or FRDN signal) that will effectively change the frequency of VCO 500 to relocate sample S1 by more than one position. As an example and not by way of limitation, if state machine 250 is operating in state "+4" (e.g., the outermost state on the positive side) and subsequently detects a data transition that would require state machine 250 to transition beyond state "+4" (e.g., if the value of sample S1 does not match the value of sample S0), state machine 250 may assert a FRUP signal to compensate for the overflow. In turn, the FRUP signal will increase the frequency of VCO 500 and state machine 250 may transition from state "+4" to "+2" thus skipping a bit. State machine 250 may continue to apply FRUP signals for each subsequent overflow until the frequency of VCO 500 matches the frequency of input data signal 104.

Once the frequency of VCO 500 matches the frequency of input data signal 104, state machine may cease overflowing or underflowing and may continue operating within the range of states "−4" to "+4" to provide phase correction as described above to compensate for any phase difference between clock signal 102 and input data signal 104. One of ordinary skill in the art will appreciate that the above-described state detection scheme of state machine 250 has been described with respect to 3× oversampling for the sake of explanatory simplicity and will further appreciate that the present disclosure contemplates state machine 250 using a similar state detection scheme adapted to any suitable oversampling rate (e.g., 4×, 8×, etc.). One of ordinary skill in the art will further appreciate that the number of states in state machine 250 has been limited to nine for the sake of explanatory simplicity and will further appreciate that the present disclosure contemplates the use of any suitable number of states in state machine 250.

Figure 4A:
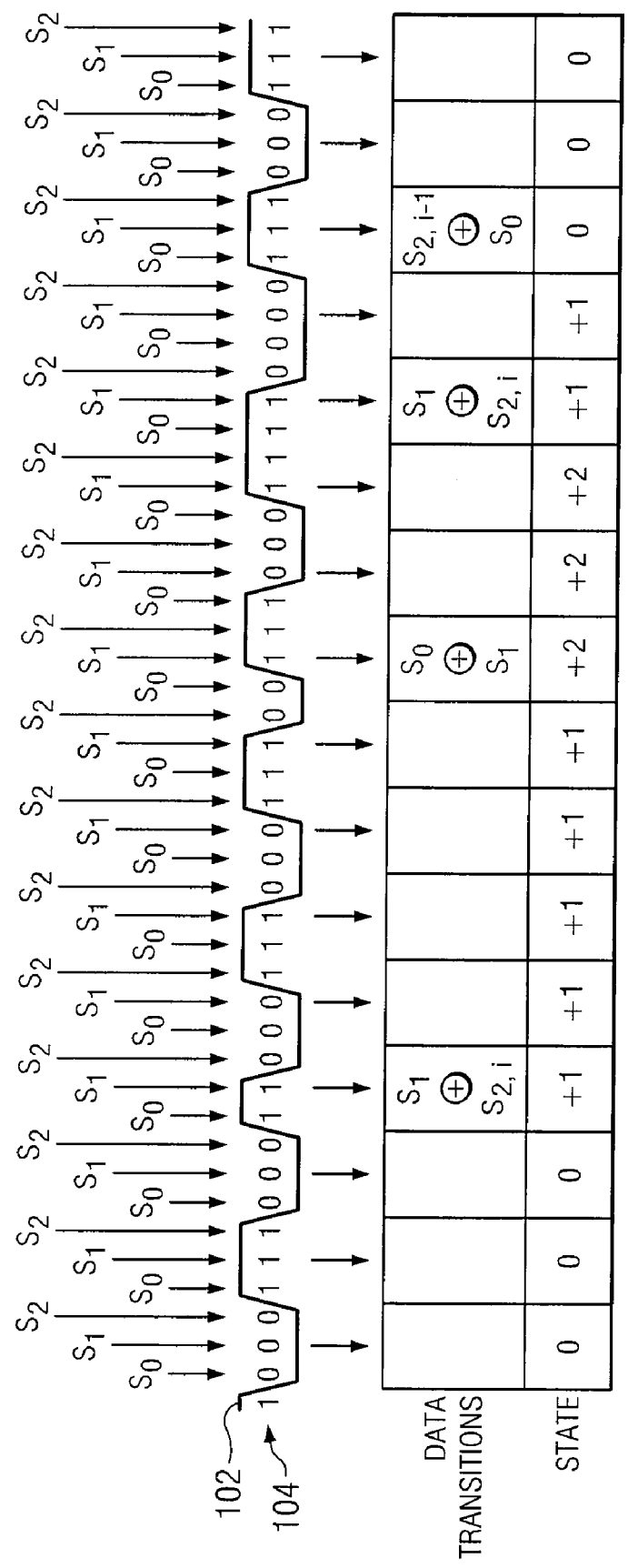
FIG. 4a illustrates an example use of the system of FIG. 1 to track the phase of an input data signal.
Figure 4B:
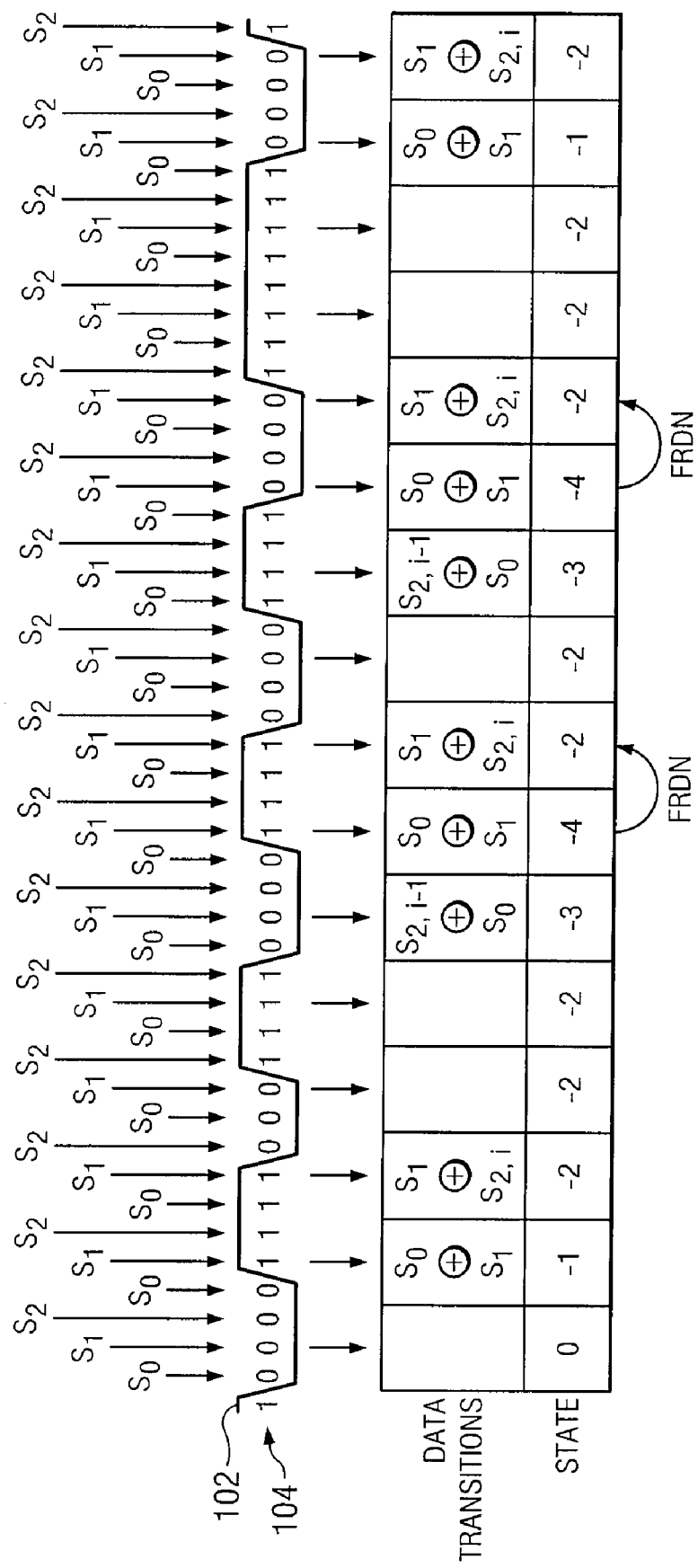
FIG. 4b illustrates an example use of the system of FIG. 1 to acquire the frequency of an input data signal.

FIGS. 4a and 4b each illustrate an example operation of state machine 250 on input data signal 104 and clock signal 102 using the state scheme described above with reference to FIG. 3. It is assumed that system 100 has been configured for 3× oversampling, and thus, should obtain 3 samples per bit when the frequency of the signals match, and moreover, sample S1 should continually align with the center of each bit when the phase of the two signals match. FIG. 4a illustrates an example operation of state machine 250 to track, acquire, and/or maintain the phase relationship between input data signal 104 and clock signal 102 and FIG. 4b illustrates an example operation of state machine 250 to track, acquire, and/or maintain the frequency relationship between input data signal 104 and clock signal 102.

Referring to FIG. 4a, input data signal 104 is represented, for explanatory purposes, as an alternating stream of "1s" and "0s." Clock signal 102 is represented, for explanatory purposes, by a series of arrows indicating the three sampling phases s0, s1, and s2. The sampling phases can be obtained from one physical clock signal, or multiple phases can be generated with appropriate delay between adjacent phases. Moreover "1s" or "0s" within each "wave" represent the samples of input data signal 104 obtained by sampler 255. For reference purposes, a particular group of samples (e.g., sample S0, sample S1, and sample S2) is referred to as a sample set, each sample set being represented by a box in the "data transitions" chart.

As can be seen from the figure, during the first three sample sets, the phase and frequency of clock signal 102 and input data signal 104 match. Consequently, each of the samples in each sample set have identical values and state machine 250 remains in state "0" during the first three sample sets. However, during the 4th sample set, a phase drift occurs between clock signal 102 and input data signal 104 which causes the phase of clock signal 102 to lag behind the phase of input data signal 104 by ⅓ UI. Phase detector 250 detects this phase drift as a data transition between position S1 and S2,i and consequently transitions from state "0" to state "+1" to track the phase change. Clock signal 102 continues to lag behind input data signal 104 by ⅓ UI for the next 4 sample sets and therefore state machine 250 continues to remain in state "+1" for the next four sample sets. During this time, since the state machine is in a state that indicates that the clock is slower than the data, an UP signal is asserted that increases the instantaneous frequency of the VCO, thus working to reduce the phase error.

By the ninth sample set, a second phase drift occurs between clock signal 102 and input data signal 104 which causes the phase of clock signal 102 to lag behind the phase of input data signal 104 by ⅔ UI. Phase detector 250 detects this phase drift as a data transition between position S0 and S1 and consequently transitions from state "+1" to state "+2" to track the phase change. Clock signal 102 continues to lag behind input data signal 104 by ⅔ UI for the next 2 sample sets and therefore state machine 250 continues to remain in state "+2" for the next 2 sample sets. Since clock signal 102 is still slower than data signal 104 during this time, state machine 250 continues asserting the UP signal to reduce the phase error.

By the 12th sample set, due to the increase of the VCO phase by means of asserted UP signal, the phase of clock signal 102 drifts back toward the phase of input data signal 104. In particular, at the 12th sample set, the phase of clock signal 102 increases by ⅓ UI and therefore lags behind the phase of input data signal 104 by ⅓ UI. Phase detector 250 detects this phase drift as a data transition between position S1 and S2,i and consequently transitions from state "+2" to state "+1" to track the phase change. A similar phase drift occurs at the 13th sample set which causes the phase of clock signal 102 to drift back toward the phase of input data signal 104 by another ⅓ UI and therefore the phase of clock signal 102 matches the phase of input data signal 104. Phase detector 250 detects this phase drift as a data transition between position S2,i−1 and S0 and consequently transitions from state "+1" to state "0" to track the phase change. At this point, the UP signal is withdrawn after which, clock signal 102 remains in phase with input data signal 104 for the remainder of the sample sets and therefore state machine 250 continues to remain in state "0" for the remainder of the sample sets.

As mentioned above, in particular embodiments, state machine 250 may assert one or more phase correction signals to alter the phase of the clock signal 102 to compensate for a phase difference between clock signal 102 and input data signal 104. While the pictured embodiment was described with reference to the phase tracking abilities of state machine 250 for explanatory purposes, particular embodiments of phase detector 250 may assert one or more phase correction signals as soon as a phase discrepancy is detected between clock signal 102 and input data signal 104 to compensate for any such discrepancy. Thus, state machine 250 may actively maintain or acquire the phase of input data signal 104 rather than merely tracking a phase discrepancy between clock signal 102 and input data signal 104.

In particular situations (e.g., at startup), the frequency of clock signal 102 generated by VCO 500 may not match the frequency of input data signal 104. In particular embodiments, a frequency discrepancy between clock signal 102 and input data signal 104 will cause a gradual and consistent shift through the positive or negative states of state machine 250. Eventually, such shift causes an overflow or an underflow of state machine 250. In turn, state machine 250 may interpret such an overflow or underflow as a frequency discrepancy between clock signal 102 and input data signal 104 and may instruct phase detector 200 to iteratively assert one or more frequency correction signals (e.g., a FRUP signal or a FRDN signal) to adjust the frequency of clock signal 102 until state machine 250 stops underflowing or overflowing. By using an overflow or an underflow of state machine 250 to detect a frequency difference between clock signal 102 and input data signal 104, and by iteratively asserting frequency correction signals until such underflowing or overflowing of state machine 250 stops, system 100 may acquire the frequency of input data signal 104 without the use of a reference clock.

FIG. 4b illustrates an example situation wherein state machine 250 is used to acquire the frequency of input data signal 104 during startup (e.g., when system 100 first receives input data signal 104). As can be seen from the figure, the frequency of clock signal 102 is greater than the frequency of input data signal 104; therefore, sampler 255 is obtaining more than three samples (in average) of each bit in input data signal 104. As mentioned above, when system 100 is properly calibrated for 3× oversampling, sampler 255 should obtain 3 samples per bit.

To acquire the frequency of input data signal 104, state machine 250 begins in state "0" as a point of reference and begins tracking the data transitions as described above with reference to FIG. 4a. However, the frequency discrepancy between clock signal 102 and input data signal 104 causes a series of data transitions which, in turn, cause state machine 250 to gradually change states until state machine 250 underflows. More particularly, the frequency discrepancy between clock signal 102 and input data signal 104 causes state machine 250 to gradually transition from state "0" to state "−4." Once state machine reaches state "−4" (e.g., at the 7th sample set) an underflow occurs. In response to the underflow, state machine 250 asserts a FRDN signal to increase the frequency of clock signal 102 and furthermore transitions from state "−4" to state "−2." After asserting the first FRDN signal, state machine 350 continues to track input data signal 104. However, the frequency of clock signal 102 is still greater than the frequency of input data signal 104. Consequently, at the 11th sample set, state machine 250 overflows a second time and accordingly asserts another FRUP signal to increase the frequency of clock signal 102 yet again. Furthermore, state machine 250 again transitions from state "−4" to state "−2" again and continues to track input data signal 104.

After asserting the second FRDN signal, state machine 250 encounters two adjacent bits of identical value in input data signal 104 (e.g., a "1" adjacent to another "1"); however, state machine 250 merely continues to operate as described above until the next data transition occurs. Once the next data transition occurs, state machine 250 continues to track input data signal 104 as described above and will continue to underflow and assert FRDN signals until the frequency of clock signal 102 matches the frequency of input data signal 104. Once the frequency of clock signal 102 matches the frequency of input data signal 104, sampler 255 will repetitively obtain 3 samples per bit and system 100 may operate in phase detection mode as described with respect to FIG. 4a to acquire the phase of input data signal 104. Subsequently, state machine 250 will converge toward state "0" by means of asserting an UP or DN signal.

Although particular steps of the present disclosure are described and illustrated as occurring in a particular order, the present disclosure contemplates any suitable steps of occurring in any suitable order. Moreover, although particular components of FIG. 1 are described and illustrated as executing particular steps in the present disclosure, the present disclosure contemplates any suitable components executing any suitable steps.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. A signal processing method for frequency and phase acquisition without using an external reference clock, comprising:
   receiving a data signal comprising a plurality of bits, the data signal having a frequency and a phase;
   without using an external reference clock, generating a clock signal having a frequency and a phase;
   acquiring a plurality of samples from the data signal at a sampling rate determined by the clock signal;
   determining whether a transition point from a first bit in the plurality of bits to a second bit in the plurality of bits occurs within the plurality of samples;
   if it is determined that the transition point occurs within the plurality of samples, transitioning from a first state to a second state in a state machine, the state machine comprising a plurality of states; and:
      if the transition from the first state to the second state does not cause the plurality of states in the state machine to be exceeded, where the first state and the second state are adjacent to one another, adjusting the phase of the clock signal to correlate with the phase of the data signal; and
      if the transition from the first state to the second state causes the plurality of states in the state machine to be exceeded, where the first state comprises an outermost state in the plurality of states and the second state comprises a state that is separated from the first state by one or more intervening states, adjusting the frequency of the clock signal to correlate with the frequency of the data signal.

2. The method of claim 1, wherein each state in the state machine corresponds to a discrete amount of phase displacement between the data signal and the clock signal.

3. The method of claim 1, wherein a transition from the first state to the second state in the state machine corresponds to a transition from a first sampling position to a second sampling position on one or more bits in the plurality of bits.

4. The method of claim 1, wherein determining whether a transition point occurs within the plurality of samples comprises:
   selecting a first sample and a second sample within the plurality of samples; and
   determining whether a transition point from a first bit in the plurality of bits to a second bit in the plurality of bits occurs between the first sample and the second sample.

5. The method of claim 1 wherein:
   determining whether a transition point from a first bit in the plurality of bits to a second bit in the plurality of bits comprises applying an exclusive OR ("XOR") function to a first sample and a second sample in the plurality of samples; and
   the first sample and the second sample to be XOR'ed are determined by a particular state in the state machine.

6. The method of claim 1, wherein:
   the plurality of samples comprises a set of samples and further comprising:
   repetitively acquiring sets of samples;
   repetitively determining whether a transition point from a first bit in the plurality of bits to a second bit in the plurality of bits occurs within the each set of samples; and
   repetitively adjusting the clock signal to correlate with the data signal until it is determined that no transition point occurs within a particular set of samples.

7. The method of claim 1, wherein the plurality of samples comprises three or more samples of a bit in the data signal.

8. A signal processing system for phase and frequency acquisition without an external reference clock, comprising:
- a signal generator operable without the use of an external reference clock to generate a clock signal having a frequency and a phase;
- a sampler operable to:
  - receive a data signal comprising a plurality of bits, the data signal having a frequency and a phase;
  - acquire a plurality of samples from the data signal at a sampling rate determined by the clock signal;
- a state machine comprising a plurality of states and operable to:
  - determine whether a transition point from a first bit in the plurality of bits to a second bit in the plurality of bits occurs within the plurality of samples;
  - if it is determined that the transition point occurs within the plurality of samples, transition from a first state to a second state; and:
    - if the transition from the first state to the second state does not cause the plurality of states in the state machine to be exceeded, where the first state and the second state are adjacent to one another, adjust the phase of the clock signal to correlate with the phase of the data signal; and
    - if the transition from the first state to the second state causes the plurality of states in the state machine to be exceeded, where the first state comprises an outermost state in the plurality of states and the second state comprises a state that is separated from the first state by one or more intervening states, adjust the frequency of the clock signal to correlate with the frequency of the data signal.

9. The system of claim 8, wherein each state in the state machine corresponds to a discrete amount of phase displacement between the data signal and the clock signal.

10. The system of claim 8, wherein the state machine is operable to determine whether a transition point occurs within the plurality of samples by:
- selecting a first sample and a second sample within the plurality of samples; and
- determining whether a transition point from a first bit in the plurality of bits to a second bit in the plurality of bits occurs between the first sample and the second sample.

11. The system of claim 10, wherein a transition from the first state to the second state in the state machine corresponds to a transition from a first sampling position to a second sampling position on one or more bits in the plurality of bits.

12. The system of claim 8, wherein:
- the state machine is operable to determine whether a transition point from a first bit in the plurality of bits to a second bit in the plurality of bits by applying an exclusive OR ("XOR") function to a first sample and a second sample in the plurality of samples; and
- the first sample and the second sample to be XOR'ed are determined by a particular state in the state machine.

13. The system of claim 8, further comprising:
- a single feedback loop that includes the signal generator, the state machine, and the sampler, the single feedback loop operable to match the frequency and phase of the clock signal with the phase and frequency of the data signal without an external reference clock.

14. The system of claim 8, wherein the plurality of samples comprises three or more samples of a bit in the data signal.

15. Signal processing logic for providing phase and frequency acquisition without using an external reference clock, the logic tangibly encoded in a device executable media and one or more devices operable when executing the logic to:
- receive a data signal comprising a plurality of bits, the data signal having a frequency and a phase;
- without using an external reference clock, generate a clock signal having a frequency and a phase;
- acquire a plurality of samples from the data signal at a sampling rate determined by the clock signal;
- determine whether a transition point from a first bit in the plurality of bits to a second bit in the plurality of bits occurs within the plurality of samples;
- if it is determined that the transition point occurs within the plurality of samples, transition from a first state to a second state in a state machine, the state machine comprising a plurality of states; and:
  - if the transition from the first state to the second state does not cause the plurality of states in the state machine to be exceeded, where the first state and the second state are adjacent to one another, adjust the phase of the clock signal to correlate with the phase of the data signal; and
  - if the transition from the first state to the second state causes the plurality of states in the state machine to be exceeded, where the first state comprises an outermost state in the plurality of states and the second state comprises a state that is separated from the first state by one or more intervening states, adjust the frequency of the clock signal to correlate with the frequency of the data signal.

16. The logic of claim 15, wherein each state in the state machine corresponds to a discrete amount of phase displacement between the data signal and the clock signal.

17. The logic of claim 15, wherein:
- the one or more devices are operable to determine whether a transition point occurs within the plurality of samples by:
- selecting a first sample and a second sample within the plurality of samples; and
- determining whether a transition point from a first bit in the plurality of bits to a second bit in the plurality of bits occurs between the first sample and the second sample.

18. The logic of claim 15, wherein a transition from the first state to the second state in the state machine corresponds to a transition from a first sampling position to a second sampling position on one or more bits in the plurality of bits.

19. The logic of claim 15, wherein:
- the one or more devices are operable to determine whether a transition point from a first bit in the plurality of bits to a second bit in the plurality of bits by applying an exclusive OR ("XOR") function to a first sample and a second sample in the plurality of samples; and
- the first sample and the second sample to be XOR'ed are determined by a particular state in the state machine.

20. The logic of claim 15, wherein the plurality of samples comprises three or more samples of a bit in the data signal.

* * * * *